June 20, 1950  H. F. KAISER  2,511,853
RADIOGRAPHIC SCANNING UNIT
Filed Oct. 8, 1946  2 Sheets-Sheet 2
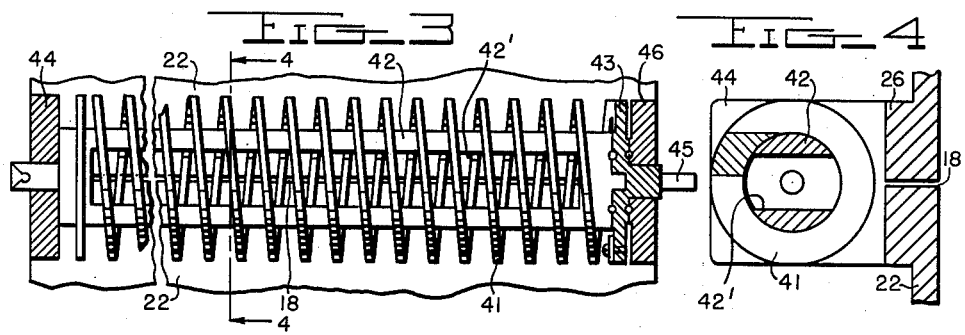
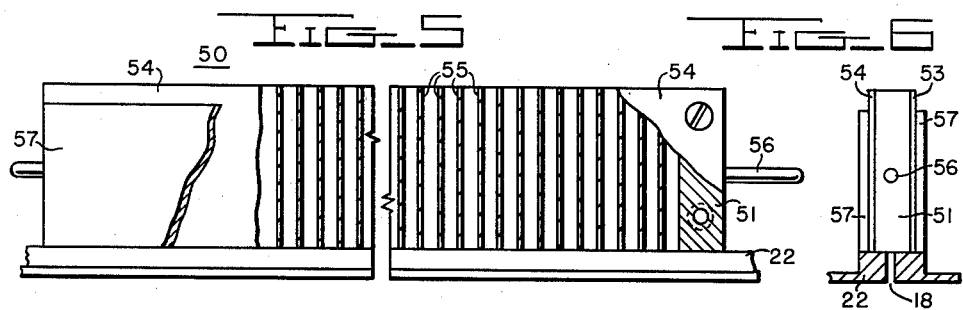
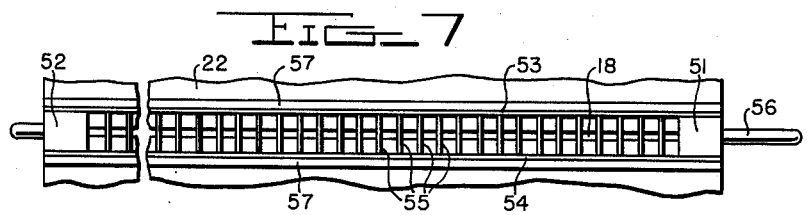
INVENTOR.
HERMAN F. KAISER
BY  M. O. Hayes
ATTORNEY Patented June 20, 1950

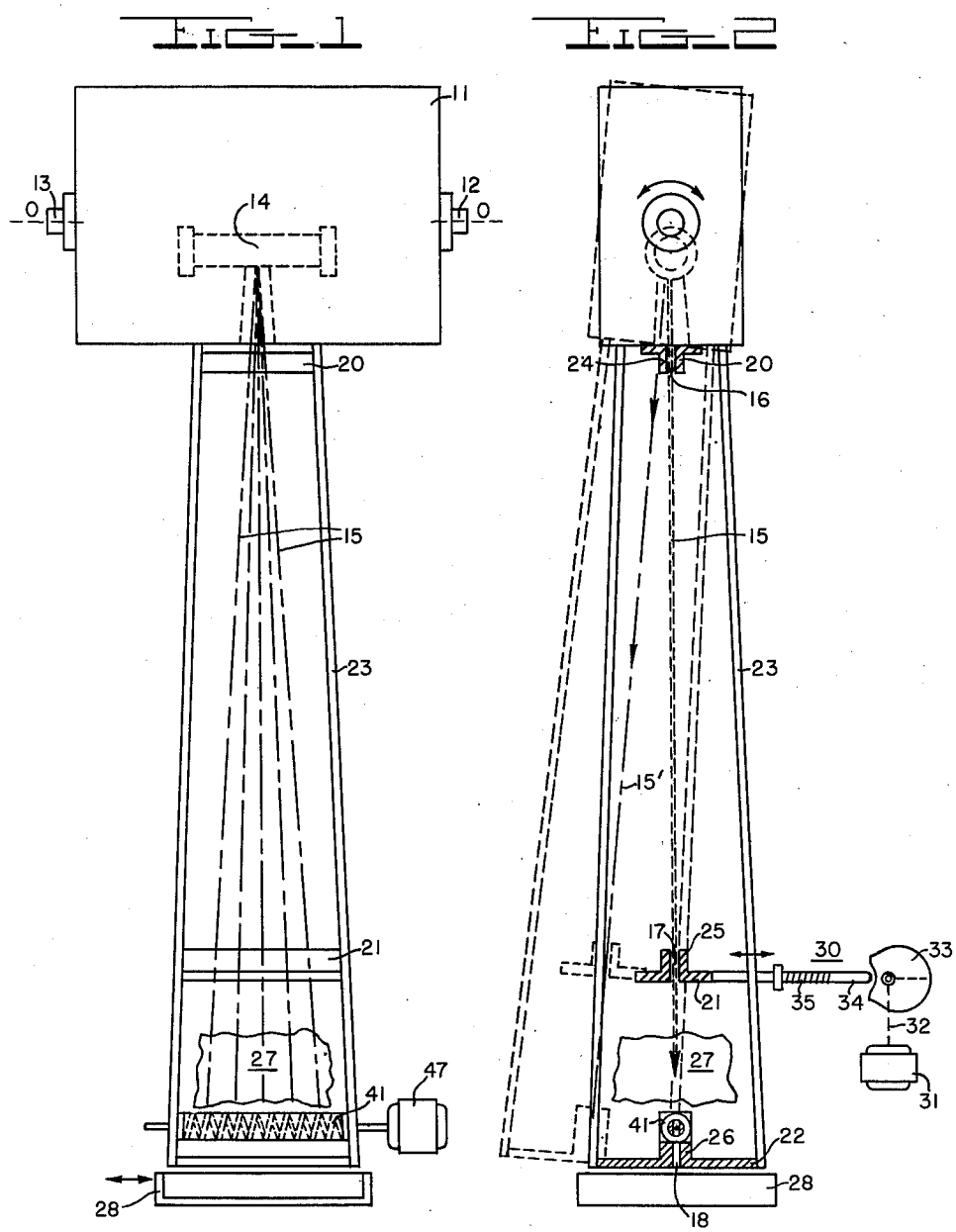

2,511,853

UNITED STATES PATENT OFFICE 2,511,853

RADIOGRAPHIC SCANNING UNIT

Herman F. Kaiser, Washington, D. C.

Application October 8, 1946, Serial No. 701,863

5 Claims. (Cl. 250—62)

(Granted under the act of March 3, 1883, as amended April 30, 1928; 370 O. G. 757)

The present invention relates in general to the examining and testing of opaque objects and more particularly to radiographic testing systems having means for eliminating blurring due to secondary or scattered radiation.

Radiographic testing systems for the examination of opaque objects as to density, size and presence of flaws or impurities by passing penetrating radiation such as X-ray or gamma radiation or corpuscular radiation through the objects and detecting the emergent radiation by means of an ionization chamber or Geiger-Mueller tube and suitable measuring circuits, or by a radiographic recording cassette, are well known. However, such systems, particularly those producing a radiographic image of the test object in a recording cassette, are subject to irregular measurement and faulty image recording due to scattering of the radiation beam and secondary radiation from particles making up the test object. Since these systems rely primarily on the point by point examination of radiation transmitted through portions of the test object alined with the source of radiation and progressive points on the plane of the detector, the scattered or secondary radiation, directed at an angle to the direction of propagation of the primary radiation beam, would produce at the points at which they encountered the detector radiation intensities other than those obtaining due to the primary emergent radiation alone.

Accordingly, it is an object of this invention to provide a radiographic device adapted to prevent blurring due to scattering and secondary radiation.

Another object of the invention is to provide an improved and simplified radiographic device.

Another object of the invention is to provide a non-destructive method of inspecting opaque objects.

Another object of the invention is to provide a radiographic inspection device in which a planar beam of radiation is progressively scanned through the total area of a test object.

Another object of the invention is to provide a radiographic device adapted to scan a test object with a planar beam and having a shadow eliminating apertured means synchronized with the scanning movement of the beam.

In accordance with the invention, it is proposed to eliminate scattering and secondary radiation by forming incident radiation from a standard X-ray source into a planar beam disposed perpendicularly to the incident surface of the test object and of angular width at the object greater than that of the object, sweeping the incident beam across the test object and detecting the emergent radiation from the test object by a radiation sensitive device. In the path of the emergent beam between the test object and the sensing device is inserted an apertured member adapted to transmit only the emergent radiation co-extensive with the primary rays of the incident planar beam and to vary in an oscillatory manner the selective transmission of the primary emergent radiation continuously within the lateral boundaries or limits defined by the planar beam.

Further aims, objects and advantages of this invention will appear from a consideration of the following description and the accompanying drawing showing for purely illustrative purposes embodiments of this invention. It is to be understood, however, that the description is not to be taken in a limited sense, the scope of the invention being defined in the appended claims.

Referring to the drawings:

Fig. 1 is a front elevation of the radiographic device;

Fig. 2 is a side elevation of the radiographic device, partially in section and partially in elevation;

Fig. 3 is a plan view of the helicoidal member forming one species of the apertured means employed in the device;

Fig. 4 is a section of the helicoidal member of Fig. 3;

Fig. 5 is a front view of another species of the apertured means, partially in elevation and partially in section;

Fig. 6 is an end view of the apertured means of Fig. 5;

Fig. 7 is a top view of the apertured means of Fig. 5.

Referring to Figs. 1 and 2 showing front and side views respectively of the radiographic device, tube head 11 of an X-ray machine of conventional design, or other convenient source of penetrating radiation, is supported by trunnions 12 and 13 in such a manner that it can be rotated about an axis o—o passing approximately through the surface from which the penetrating radiation is emitted. In the embodiment shown, the radiation originates from the target of a conventional X-ray tube 14 in the form of a conical beam. The conical beam emanating from the target of the X-ray tube 14 is intercepted by a series of slits 16, 17 and 18 formed in slit defining plates or blocks 20, 21 and 22 respectively supported by a frame member 23 rigidly mounted on the tube head 11 to shape the beam of radiation into a planar beam of substantial lateral beam width. The term "planar beam" as here used defines a beam whose cross-section is of considerably greater width than thickness. To further aid in collimating the beam of radiation and defining the planar configuration of the radiation beam, flanges 24, 25 and 26 may be mounted on the slit defining plates 20, 21 and 22 adjacent to the slits defined therein. To prevent radiation from escaping laterally from the device and endangering operating personnel, shielding may be provided by covering the frame member 23 with material opaque to the radiation.

The test object 27 to be examined is rigidly supported independently of the unitary structure formed by the frame 23 and the tube head 11 in a position to intercept the planar collimated beam of radiation between slits 17 and 18. The test object is thus penetrated by a single planar collimated beam, resulting in a minimum of total irradiation of the object and a minimum of emergent scattered or secondary radiation. This penetration of the object by the planar collimated beam reduces scattering and renders the use of a wider slot 18 for a given resolution, than would be possible without the collimated incident beam. A radiation sensitive means 28 such as a standard radiographic recording cassette is fixedly positioned relative to the test object 27 below the slit 18 and independently of the unitary structure defined by the frame member 23 and tube head 11.

Obviously, other known radiographic detection means such as a network of Geiger-Mueller counters or ionization chambers fixedly supported relative to the target object 27 or adapted to be maintained in a fixed positional relationship with the planar beam 15, and their associated measuring circuits, may be substituted for the recording cassette 28 shown in this embodiment.

The detecting means, of whatever type employed, should be shielded by protective lead from radiation directed from the side or rear of the detecting means.

The planar beam of penetrating radiation 15 is made of suitable angular width along its major sectional dimension to extend across the incident surface of the test object 27. In order to direct the incident beam of radiation over the entire incident surface area of the target 27, means 30 are provided to impart lateral displacement at a uniform rate to the unitary frame 23 and tube head 11, and thus to the planar beam defined by the slit defining members 20, 21 and 22 rigidly supported in the frame member 23, in a direction substantially normal to the planar beam so as to scan the beam laterally over the incident surface of the target 27. The target may be scanned by sweeping the planar beam once laterally across the incident surface of the target or by sweeping the planar beam in a reciprocating or oscillatory fashion, continuously back and forth across the target. For purpose of illustration, the latter species is described in detail in the present embodiment. A continuously operating motor 31 of conventional design is coupled by means of a shaft or mechanical coupling schematically indicated at 32 to a cam 33. The cam 33 is so cut as to impart motion to the frame 23 and tube head 11 about the axis o—o through the shaft 34, held against the cam surface by spring 35, to sweep the planar beam across the test object at a speed varying in such a way as to cause uniform exposure of the stationary recording device 28 positioned below slit 18. The frame 23 is shown in one extreme position of its oscillation imparted by the reciprocating means 30 by the dotted lines in Fig. 2, in which it will be noted that the planar beam indicated at 15' has been swung over and to the left of the target object 27 in a position to expose through the slits 16, 17 and 18 the left edge of the recording device 28. The frame 23 is swung through an equal angle in the other direction by the reciprocating means 30.

It will be noted that as the planar beam 15 is oscillated back and forth across the incident surface of the target object 27, scattered radiation emergent from the target produced by reflection of the incident planar beam from particles making up the object 27 or re-radiations of emergent energy from such particles generated when such particles are excited by impinging radiation will produce emergent rays of radiation from the target at angles other than those of the primary rays making up the incident planar beam which will fall on the recording surface of the cassette 28 in superposed relation with the primary rays. This would indicate at the positions on the recording surface at which such scattered or secondary radiation falls, emergent radiation intensities and thus indications of density or volume of the test object other than those which actually exist in the line of sight between the position of such indications on the recording surface and the point source of the penetrating radiation, for example the target of the X-ray tube 14. To eliminate the consequent inaccurate indication of the test object density, a device is supported by extension members in juxtaposed relation to the slit 18 between the slit defining plate 22 and the test object 27 by which the effect of radiation scattered within the test object is minimized. This device in its generic form consists of a hollow transverse member of thickness sufficient to allow passage of the planar beam defined by the first two slits 16 and 17 of the device and carrying a large number of channels or apertures either directed at the source of radiation or parallel to each other and to the directional axis of the primary rays, which channels serve to pass radiation to the radiographic recording cassette only in the direction of the primary radiation and eliminate skew radiation at greater than a preselected angle to the primary radiation. Two specific embodiments of such a device to minimize scattering in the transverse plane of the planar beam are described below and shown in Figs. 3 through 7 inclusive.

Referring now to Figs. 3 and 4 showing one embodiment of skew radiation eliminating device in positional relationship with the slit 18 and the slit defining plate 22, this device, hereinafter referred to as an apertured member, comprises a helicoid 41 such as a spiral ribbon spring rotatably supported on a guide cylinder 42 having a slit 42' extending diametrically through the guide cylinder.

The helicoid is of the type generated by a line touching two concentric cylinders, moving along a helix on one of the cylinders at a constant angle with the axies. Cylinder 42 is mounted between plate 43 and stationary end plate 44 and is adapted to be angularly positioned so that slot 42' may be selectively adjusted to transmit the radiation beam. The guide cylinder 42 is of such a diameter that the inner periphery of the helicoid bears against and rotates on the outer periphery of the cylinder. One end of the helicoid is carried by the rotatable plate 43 and the other end is free, thereby preventing variation in the spacing between successive turns of the helicoid when a torque is applied to the plate 43. The plate 43 is rotatably supported through trunnion 45 in fixed end plate 46 which, with end plate 44, is mounted on the slit defining plate 22.

This apertured member 41 is mounted above the plate 22 with its axis intercepting the planar beam of radiation and co-extensive therewith and parallel to the slit 18. The turns of the helicoid divide the planar beam into a plurality of separate substantially parallel beams while the slit 42' prevents transmission of rays approaching the slit at a substantial angle to the primary rays. Direct radiation is thus transmitted through the apertured member. Most of the secondary or scattered radiation emerging oblique to the primary rays from the target object 27 and source 14 will strike the turns of the helicoid and be absorbed. Continuously operating motor means 47 are mechanically coupled to the trunnion 45 to continuously rotate the helicoid 41 during examination of the test object to prevent formation of shadows of the separate turns of the helicoid due to absorption of the incident emergent radiation impinging thereon. For sake of illustration, the turns of the helicoid 41 are shown considerably wider and spaced farther apart than in the actual device, it being understood that such design features are dependent upon the special relationship of the test object and the apertured member.

Referring now to Figs. 5, 6, and 7 showing the front, end and side views respectively of a second species of the apertured member, there is shown the slide member 50 comprising vertically disposed end plates 51 and 52, side plates 53 and 54 connected therebetween and a series of baffles 55 spaced in the opening formed between the side and end plates and extending in such a direction that their major dimension is substantially parallel to the major directional axis of the planar beam 15. There is thus formed therebetween a series of transversely disposed channels either substantially parallel to the major directional axis of the primary rays or orientated in such a manner that their axes converge at a point coincident with the source of penetrating radiation. The baffle plates 55 thus serve the same function as the individual turns of the helicoid 41. This multi-apertured slide member 50 is mounted in juxtaposed relation with the slit 18 between the slit defining plate 22 and the test object 27 so that a line connecting the centers of each of the apertures formed between the baffles 55 is substantially parallel to the slit 18. This hypothetical line is substantially coincident with the major axis of the slide member and is positioned substantially parallel to the major axis of the planar beam. Means such as a power driven eccentric cam, off-center coupling or crank arm, or any such means known in the art for imparting simple harmonic or other desired translatory motions to a movable device in one plane, is coupled to the slide member 50 through a shaft 56 mounted on the end plate 51 so as to impart reciprocating or oscillatory motion to the multi-apertured slide member. Primary emergent radiation is thus transmitted through the apertures formed by the baffle plates 55 and skew radiation due to scattering or secondary radiation in the test object 27 is largely absorbed by the baffle plates. The multi-apertured slide member 50 is mounted between guide members 57 disposed on or adjacent to the flanges 26 on the slit defining member 22 to confine the motion imparted to the slide member 50 by the reciprocating mechanism to movement back and forth in a plane parallel to the slit. This motion, like the rotary motion in the helicoidal member, serves to minimize the formation of shadows on the recording surface of the radiographic cassette 28 by the baffle plates.

It will be apparent that the above described multi-apertured members serve to divide the emergent planar beam from the test object 27 into a plurality of separate, selected, substantially collimated beams co-extensive with the primary rays comprising the incident planar beam and continually shift this selection or division of rays so as to eliminate all rays subtending a preselected angle with the primary rays making up the incident planar beam to prevent formation of shadows of the baffles on the recording surface of the radiographic cassette.

While I have particularly shown and described one particular embodiment of the invention, it is distinctly understood that the invention is not limited thereto but that modifications may be made within the scope of the invention and such variations as are covered by the scope of the appended claims.

The invention described herein may be manufactured and used by or for the Government of the United States of America for governmental purposes without the payment of any royalties thereon or therefor.

What is claimed is:

1. A radiographic device for examining a test object comprising a source of radiation, means forming the incident radiation into a relatively thin collimated planar beam, means supporting the test object, means for sweeping the beam of incident radiation across the test object in a direction normal to the plane of the beam to irradiate a single line portion of the test object at a time, and means sensitive to the emergent radiation for detecting said radiation.

2. The method of examining an object comprising the steps of passing a collimated planar beam of penetrating radiation through the object, sweeping the beam in a plane at right angles to the plane of the beam across the object to scan the total object area one line portion at a time with minimum scattering within the object, dividing the planar beam emerging from said object into a plurality of selected narrow beams lying side by side in the plane of the planar beam, continuously varying the division of said planar beam, and detecting the emergent selected beams of radiation over the total area scanned.

3. A radiographic device for examining a test object comprising a source of radiation, means forming the radiation into a collimated planar beam, means supporting the test object, means imparting an oscillatory motion to the beam forming means about an axis approximately through the source of radiation to sweep the planar beam of radiation across the test object in a direction normal to the plane of the beam to irradiate one line portion of the test object at a time, and means sensitive to the emergent radiation for detecting said radiation.

4. A radiographic device for examining an object comprising a source of penetrating radiation, means for forming the radiation into a collimated planar beam, means supporting said object, means rotating the beam forming means about an axis through the source of radiation operative to sweep the beam with oscillatory motion across said object in a direction normal to the plane of said beam to irradiate one line portion of the test object at a time, multichannel means operative to transmit therethrough only the primary rays of emergent radiation, and means positioned to intercept the transmitted primary emergent radiation and sensitive to such radiation to detect said radiation.

5. A radiographic device for examining an object comprising a source of radiation, means forming the radiation into a planar beam, means supporting said object, means rotating the beam forming means about an axis through the source of radiation or parallel thereto operative to sweep the beam with oscillatory motion across said object in a direction normal to the plane of the beam, multi-apertured means for dividing the emergent planar beam into a plurality of narrow beams lying side by side in the planar beam, means for continuously shifting the multi-aperture means relative to the beam in the plane of the planar beam and with the beam in a direction normal to said first shifting movement to vary the division of said planar beam continuously over the total width of the beam, and means sensitive to the emergent radiation for detecting said radiation.

HERMAN F. KAISER.

REFERENCES CITED

The following references are of record in the file of this patent:

UNITED STATES PATENTS

| Number | Name | Date |
|---|---|---|
| Re. 21,964 | Leishman | Dec. 2, 1941 |
| 1,484,663 | Mutscheller | Feb. 26, 1924 |
| 1,890,360 | Bauermeister | Dec. 6, 1932 |
| 2,317,329 | McLachlan, Jr. | Apr. 20, 1943 |
| 2,320,587 | Gieringer et al. | June 1, 1943 |